(12) United States Patent
Shum et al.

(10) Patent No.: US 8,339,748 B2
(45) Date of Patent: Dec. 25, 2012

(54) SUSPENSION ASSEMBLY HAVING A MICROACTUATOR BONDED TO A FLEXURE

(75) Inventors: Wing C. Shum, San Mateo, CA (US);
Yanning Liu, San Ramon, CA (US);
John E. Scura, Paso Robles, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 205 days.

(21) Appl. No.: 12/826,550

(22) Filed: Jun. 29, 2010

(65) Prior Publication Data

US 2011/0317309 A1 Dec. 29, 2011

(51) Int. Cl.
*G11B 5/55* (2006.01)
(52) U.S. Cl. .................................... 360/245.8
(58) Field of Classification Search ............... 360/244.5, 360/294.3, 294.4, 245.8, 245.9
See application file for complete search history.

(56) References Cited

U.S. PATENT DOCUMENTS

| | | | |
|---|---|---|---|
| 5,521,778 A * | 5/1996 | Boutaghou et al. | ........ 360/264.5 |
| 5,754,368 A | 5/1998 | Shiraishi et al. | |
| 6,278,587 B1 | 8/2001 | Mei | |
| 6,307,715 B1 | 10/2001 | Berding et al. | |
| 6,490,228 B2 | 12/2002 | Killam | |
| 6,856,075 B1 * | 2/2005 | Houk et al. | .................... 310/348 |
| 7,064,928 B2 | 6/2006 | Fu et al. | |
| 7,177,119 B1 * | 2/2007 | Bennin et al. | ............. 360/294.6 |
| 7,218,481 B1 | 5/2007 | Bennin et al. | |
| 7,322,241 B2 | 1/2008 | Kai | |
| 7,382,582 B1 | 6/2008 | Cuevas | |
| 7,417,830 B1 * | 8/2008 | Kulangara | ................. 360/294.4 |
| 7,459,835 B1 * | 12/2008 | Mei et al. | ...................... 310/330 |
| 7,509,859 B2 | 3/2009 | Kai | |
| 7,832,082 B1 | 11/2010 | Hentges et al. | |
| 7,929,252 B1 | 4/2011 | Hentges et al. | |
| 8,149,542 B2 * | 4/2012 | Ando | ......................... 360/245.8 |
| 2002/0075606 A1 | 6/2002 | Nishida et al. | |
| 2002/0118492 A1 | 8/2002 | Watanabe et al. | |
| 2009/0190263 A1 | 7/2009 | Miura et al. | |
| 2009/0294740 A1 | 12/2009 | Kurtz et al. | |
| 2010/0177445 A1 * | 7/2010 | Fuchino | ....................... 360/294 |
| 2010/0271735 A1 | 10/2010 | Schreiber | |

* cited by examiner

*Primary Examiner* — Angel A. Castro

(57) ABSTRACT

Disclosed is a suspension assembly for a disk drive that includes: a mounting plate having a top-side and a bottom-side; a microactuator mounting structure formed in the mounting plate; a microactuator mounted in the microactuator mounting structure in which the microactuator has a top-side and a bottom-side; and a flexure attached to the bottom-side of the of mounting plate and the microactuator. The flexure includes a pad layer and a through-hole, in which the through-hole extends through the pad layer. An epoxy on the pad layer bonds widely to the microactuator and extends through the through-hole.

18 Claims, 3 Drawing Sheets

SUSPENSION ASSEMBLY HAVING A MICROACTUATOR BONDED TO A FLEXURE

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. For convenience, all heads that can read are referred to as "read heads" herein, regardless of other devices and functions the read head may also perform (e.g. writing, flying height control, touch down detection, lapping control, etc).

In a modern magnetic hard disk drive device, each read head is a sub-component of a head gimbal assembly (HGA). The read head typically includes a slider and a read/write transducer. The read/write transducer typically comprises a magneto-resistive read element (e.g. so-called giant magneto-resistive read element, or a tunneling magneto-resistive read element) and an inductive write structure comprising a flat coil deposited by photolithography and a yoke structure having pole tips that face a disk media.

The HGA typically also includes a suspension assembly that includes a mounting plate, a load beam, and a laminated flexure to carry the electrical signals to and from the read head. The read head is typically bonded to a tongue feature of the laminated flexure. The HGA, in turn, is a sub-component of a head stack assembly (HSA) that typically includes a plurality of HGAs, a rotary actuator, and a flex cable. The mounting plate of each suspension assembly is attached to an arm of the rotary actuator (e.g. by swaging), and each of the laminated flexures includes a flexure tail that is electrically connected to the HSA's flex cable (e.g. by solder bonding).

Modern laminated flexures typically include electrically conductive copper traces that are isolated from a stainless steel support layer by a polyimide dielectric layer. So that the signals from/to the head can reach the flex cable on the actuator body, each HGA flexure includes a flexure tail that extends away from the head along the actuator arm and ultimately attaches to the flex cable adjacent the actuator body. That is, the flexure includes electrically conductive traces that are electrically connected to a plurality of electrically conductive bonding pads on the head, and extend from adjacent the head to terminate at electrical connection points at the flexure tail.

The position of the HSA relative to the spinning disks in a disk drive, and therefore the position of the read heads relative to data tracks on the disks, is actively controlled by the rotary actuator which is typically driven by a voice coil motor (VCM). Specifically, electrical current passed through a coil of the VCM applies a torque to the rotary actuator, so that the read head can seek and follow desired data tracks on the spinning disk.

However, the industry trend towards increasing a real data density has necessitated substantial reduction in the spacing between data tracks on the disk. Also, disk drive performance requirements, especially requirements pertaining to the time required to access desired data, have not allowed the rotational speed of the disk to be reduced. In fact, for many disk drive applications, the rotational speed has been significantly increased. A consequence of these trends is that increased bandwidth is required for servo control of the read head position relative to data tracks on the spinning disk.

One solution that has been proposed in the art to increase disk drive servo bandwidth is dual-stage actuation. Under the dual-stage actuation concept, the rotary actuator that is driven by the VCM is employed as a coarse actuator (for large adjustments in the HSA position relative to the disk), while a so-called "microactuator" having higher bandwidth but lesser stroke is used as a fine actuator (for smaller adjustments in the read head position). Various microactuator designs have been proposed in the art for the purpose of dual-stage actuation in disk drive applications. Some of these designs utilize one or more piezoelectric microactuators that are affixed to a stainless steel component of the suspension assembly (e.g. the mounting plate or an extension thereof, and/or the load beam or an extension thereof, and/or an intermediate stainless steel part connecting the mounting plate to the load beam).

Microactuators may be electrically connected by a joint connector to the flexure in such a fashion that after prolonged storage, shipping time, exposure to high temperatures and humidity, that the joint connector develops high resistance to current flow and decreased mechanical strength which may result in breakage of the joint connector. Therefore, there is a need in the information storage device arts for a joint connector between the flexure and the microactuator that maintains better current flow and maintains better mechanical strength.

DETAILED DESCRIPTION

Figure 1:
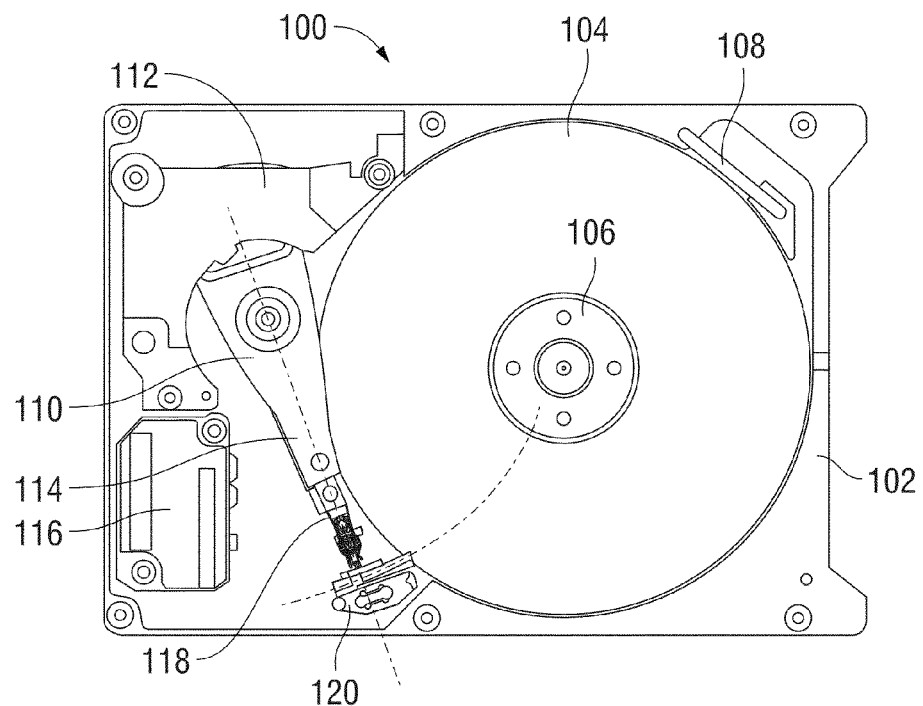
FIG. 1 is top view of a disk drive that is capable of including an embodiment of the invention.

FIG. 1 is top view of a disk drive 100 that is capable of including an embodiment of the present invention. The disk drive 100 includes a disk drive base 102. The disk drive 100 further includes a spindle 106, rotably mounted on the disk drive base 102, for rotating a disk 104 that is mounted on the spindle 106. The rotation of the disks 104 establishes air flow through optional recirculation filter 108. In certain embodiments, disk drive 100 may have only a single disk 104, or alternatively, two or more disks.

The disk drive 100 further includes a rotary coarse actuator 110 that is rotably mounted on disk drive base 102. The rotary coarse actuator 110 includes an actuator arm 114 that supports a head gimbal assembly (HGA) 118. Voice coil motor 112 rotates the actuator 110 through a limited angular range so that the HGA 118 may be desirably positioned relative to one or more tracks of information on the disk 104. Preferably the disk drive 100 will include one HGA 118 per disk surface, but depopulated disk drives are also contemplated in which fewer HGAs are used. Under non-operating conditions the HGAs may be parked on ramp 120, for example to avoid contact with the disk 104 when it is not spinning. Electrical signals to/from the HGA 118 are carried to other drive electronics, in part via a flex cable (not shown) and a flex cable bracket 116.

Figure 2:
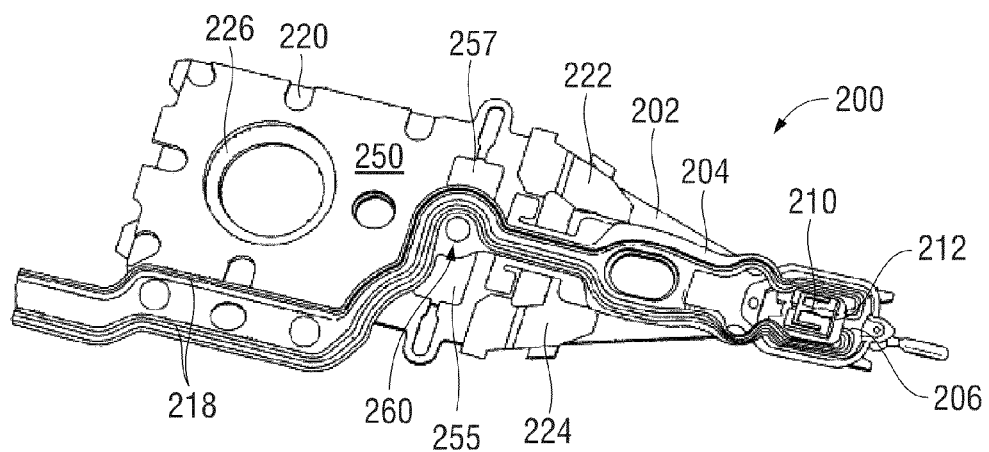
FIG. 2 is a bottom perspective view of the head gimbal assembly (HGA).

FIG. 2 is a bottom perspective view of an HGA 200. Referring additionally to FIG. 2, the HGA 200 includes a load beam 202, and a read head 210 for reading and writing data from and to a magnetic disk (e.g. disk 104). The read head 210 includes a slider substrate having an air bearing surface (the label 210 points to this surface) and an opposing top surface (not visible in the view of FIG. 2). The slider substrate preferably comprises AlTiC, although another ceramic or silicon might also be used. The slider substrate of the read head 210 also includes a trailing face 212 that includes a read/write transducer (too small to be practically shown in the view of FIG. 2, but disposed on the trailing face 212). In certain embodiments, the read/write transducer is preferably an inductive magnetic write transducer merged with a magnetoresistive read transducer. The purpose of the load beam 202 is to provide limited vertical compliance for the read head 210 to follow vertical undulations of the surface of a disk (e.g. disk 104 of FIG. 1) as it rotates, and to preload the air bearing surface of the read head 210 against the disk surface by a preload force that is commonly referred to as the "gram load."

In the embodiment of FIG. 2, the HGA 200 also includes a laminated flexure 204 attached to the load beam 202. The laminated flexure 204 includes a tongue 206 that has a read head bonding surface. The head 210 is attached to the read head bonding surface of the tongue 206 of the laminated flexure 204. Only a portion of the tongue 206 is visible in the view of FIG. 2 because the read head 210 partially obscures it. A first purpose of the laminated flexure 204 is to provide compliance for the head 210 to follow pitch and roll angular undulations of the surface of the disk (e.g. disk 104) as it rotates, while restricting relative motion between the read head 210 and the load beam 202 in the lateral direction and about a yaw axis. A second purpose of the laminated flexure 204 is to provide a plurality of electrical paths to facilitate signal transmission to/from the read head 210. For that second purpose, the laminated flexure 204 includes a plurality of electrically conductive traces 218 that are defined in an electrically conductive (e.g. copper) sub-layer of the laminated flexure 204. Electrically conductive traces 218 are isolated from a support layer (e.g. stainless steel) by a dielectric layer (e.g. polyimide).

In the embodiment of FIG. 2, the load beam 202 includes hinge plates 222 and 224, and is attached to a mounting plate 220 via the hinge plates 222 and 224 and a microactuator mounting structure 250. These components may be made of stainless steel, and their attachments to each other may be made by a plurality of spot welds, for example. Alternatively, the load beam 202 may have integral hinge plate regions rather than being assembled with separate hinge plate components, so that the load beam 202 and its hinge plates would be a single component having material continuity.

The load beam 202 with its hinge plates 222, 224 (if any), the microactuator mounting structure 250, and the mounting plate 220, may together be referred to as a "suspension assembly." Accordingly, the mounting plate 220 may also be referred to as a suspension assembly mounting plate 220. In certain preferred embodiments, the suspension assembly mounting plate 220 includes a swage boss 226 to facilitate attachment of the suspension assembly to an actuator arm (e.g. actuator arm 114). In that case, the suspension assembly mounting plate 220 may also be referred to as a "swage mounting plate." Note that, after the laminated flexure 204 is attached to the load beam 202, the laminated flexure 204 may be considered to also pertain to the "suspension assembly."

The microactuator mounting structure 250 is seen to extend from the suspension assembly mounting plate 220. In this embodiment, the microactuator mounting structure 250 is seen to be a separate sub-component that is attached to the suspension assembly mounting plate 220 (e.g. by a plurality of spot welds). However, alternatively the microactuator mounting structure 250 and the suspension assembly mounting plate 220 may be a single component having material continuity rather than being an assembly of subcomponents. A microactuator 255 may be mounted in a window of the mounting structure 250. The microactuator 255 has a top-side (not shown) and a bottom-side 257.

Figure 3:
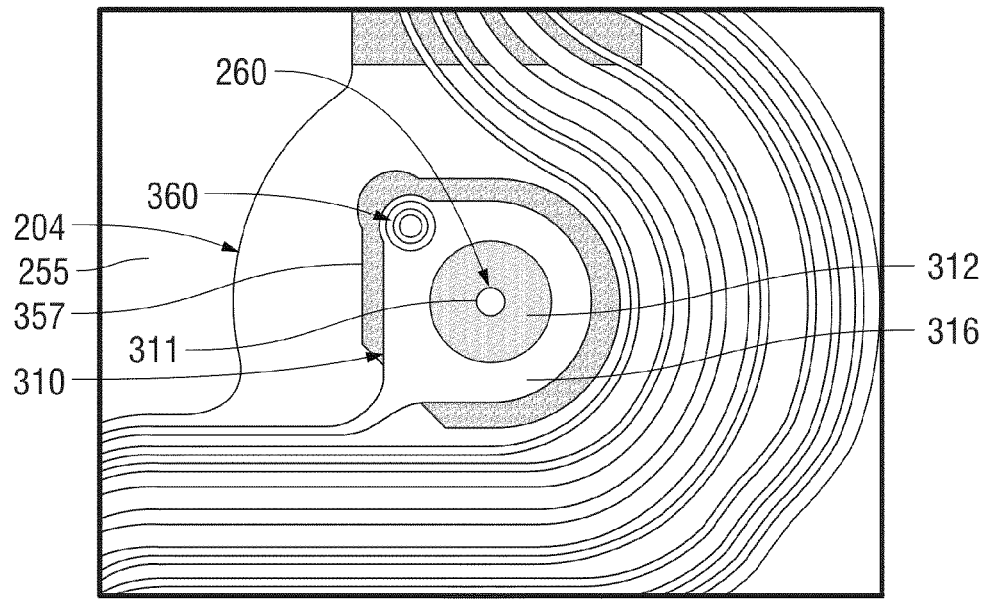
FIG. 3 is a bottom view illustrating the flexure connected to the microactuator with a single through-hole, according to one embodiment of the invention.

Turning to FIG. 3, FIG. 3 is a bottom view illustrating the flexure 204 connected to the microactuator 255, according to one embodiment of the invention. Flexure 204 includes a pad layer 310 and a through-hole 260, in which the through-hole 260 extends through the pad layer 310. An epoxy 311 is mounted in the through-hole 260 of the flexure 204 and bonds the flexure 204 to the microactuator 255, as will be described.

In particular, the flexure 204 is attached to the bottom-side of the microactuator 255 and is electrically coupled to the microactuator 255 by the epoxy bond 311. Epoxy bond 311 may also be referred to as a joint connector. In order to electronically couple the flexure 204 to the microactuator 255, a conductive epoxy 311, such as silver (Ag) may be utilized.

In one embodiment, the flexure 204 may include a pad layer 310 and a through-hole 260, wherein the through-hole 260 extends through the pad layer 310. The epoxy bond 311 may be mounted in the through-hole 260 of the flexure 204 and bonds the flexure 204 to the bottom-side of the microactuator 255. For example, the epoxy bond 311 may be mounted on the pad layer 310 directly below the through-hole 260 of the flexure 204 and the microactuator 255 pressed against the epoxy bond 311 such that the epoxy bond 311 bonds widely to the bottom-side of the microactuator 255 and extends through the through-hole 360, as will be described.

Figure 4:
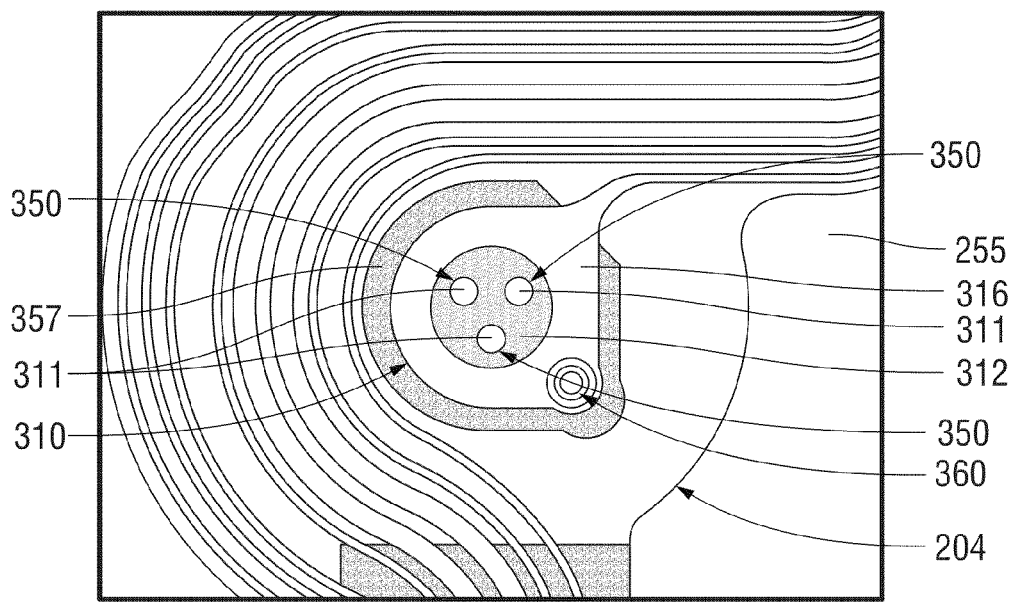
FIG. 4 is a bottom view illustrating the flexure connected to the microactuator with a plurality of through-holes, according to one embodiment of the invention.

In one embodiment, with reference to FIG. 4, a plurality of through holes 350 may be utilized. As in FIG. 3, each through-hole 350 extends through the pad layer 310. Epoxy bonds 311 may be mounted in each through-hole 350 to bond to the bottom-side of the microactuator 255, respectively.

According to one embodiment, the microactuator 255 may be a piezoelectric (PZT) microactuator. The piezoelectric microactuator may include a gold (Au) layer cover coating to which the epoxy is bonded.

Further, as can be seen in FIGS. 3 and 4, in one embodiment the pad layer 310 may include a copper (Cu) layer 316 with a gold (Au) coating 312 and a metal layer 357. Also, in one embodiment a via 360 may connect the Cu layer 316 of the flexure 204 to the metal layer 357 of the flexure. In one embodiment, the metal layer 357 is stainless steel.

Figure 5:
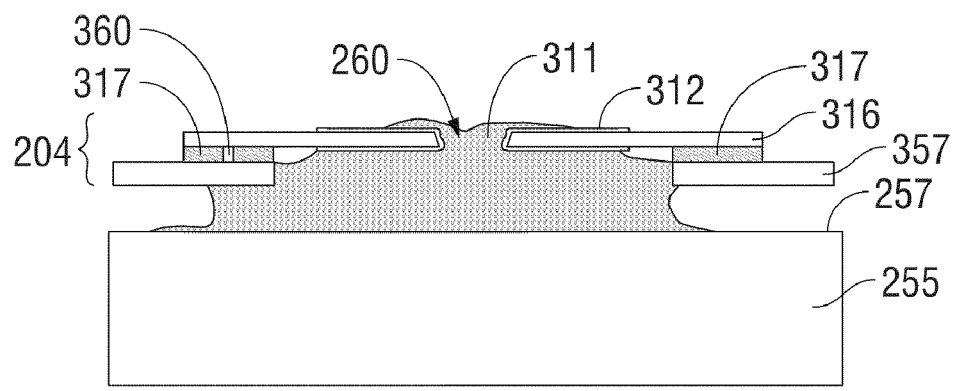
FIG. 5 is a cross-sectional view of the epoxy extending through the through-hole of the flexure to bond the flexure to the bottom-side of the microactuator, according to one embodiment of the invention.

With reference to FIG. 5, a cross-sectional view of the epoxy 311 (e.g. silver) extending through the through-hole 260 of the flexure 204 while bonding the flexure 204 to the bottom-side 257 of the microactuator 255 is shown. As previously described, the epoxy bond 311 may be mounted on the pad layer directly below the through-hole 260 of the flexure 204 and the microactuator 255 pressed against the epoxy bond 311 such that the epoxy bond 311 bonds widely to the bottom-side 257 of the microactuator 255 and extends through the through-hole 260. As can be seen in FIG. 5, the silver epoxy 311 extends through the through-hole 260 of the flexure 204 and extends through and about the gold coating 312 of the copper layer 316, through the insulator layer 317, and through the stainless steel metal layer 357 of the flexure 204 and bonds widely to the bottom-side 257 of the microactuator 255. In one embodiment, the insulator 317 is a polyimide. Also, the piezoelectric microactuator 255 may include a gold cover to which the silver epoxy 311 bonds.

Additionally, via 360 may connect the Cu layer 316 to the metal layer 357 of the flexure 204. In one embodiment, the metal layer 357 is stainless steel. Thus, in one embodiment, the pad layer may include a copper layer 316 with gold coating 312, an insulator layer 317, and a stainless steel metal layer 357.

Figure 6:
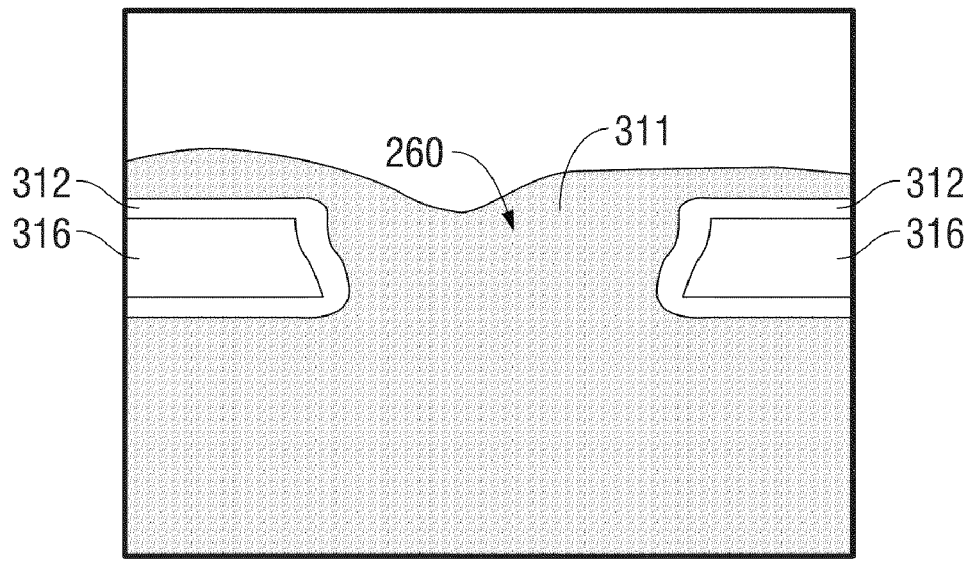
FIG. 6 is a close-up view of the epoxy extending through through-hole, according to one embodiment of the invention.

Looking briefly at FIG. 6, which is a close-up view of the silver epoxy 311 extending through the copper layer 316 with gold coating 312 of the flexure 204, it can be seen that the silver epoxy 311 overflows through the through-hole 260.

Utilizing this approach, it has been found that the silver epoxy 311 comes in wide-contact with the microactuator 255 and generates a great deal of contact area for the silver epoxy 311 with the microactuator 255. This provides a great deal of conductivity for the silver epoxy bond 311 between the flexure 204 and the microactuator 255 even during extreme environmental conditions.

Further, the shear-strength for the epoxy bond 311 (or termed joint connector) is increased due to the rivet-like feature formed by the epoxy 311. Moreover, the conductivity and the shear-strength is further improved when utilizing multiple through-holes 260 such as previously-described with reference to FIG. 4 in which three through-holes 350 were utilized for the bonding of the epoxy bonds 311 to form a plurality of joint connectors. It should be appreciated that although one and three through-hole embodiments have been illustrated in FIGS. 3 and 4, that any suitable number of through-holes may be utilized.

Moreover, by utilizing a via 360 to connect the copper layer 316 of the flexure 204 to the stainless steel metal layer 357 of the flexure 204, even better electrical connection is provided between the flexure 204 and the microactuator 255.

Under the previously-described embodiments, the epoxy bond 311 or joint connector between the flexure 204 and the microactuator 255 through which the flexure 204 applies voltage to drive the microactuator 255 is improved while further providing better joint mechanical strength. It has been found that by utilizing this type of epoxy bond 311 or joint connector that current flow is advantageously maintained as well as mechanical strength despite exposure to high temperatures and humidity and prolonged storage times.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

What is claimed is:
1. A disk drive comprising:
   a spindle attached to a disk drive base;
   a disk mounted on the spindle;
   a coarse actuator attached to the disk drive base, the coarse actuator including an actuator arm; and
   a suspension assembly attached to the actuator arm, the suspension assembly including:
      a mounting plate having a top-side and a bottom-side;
      a microactuator mounting structure formed in the mounting plate;
      a microactuator mounted in the microactuator mounting structure to position a read head, the microactuator having a top-side and a bottom-side;
      a flexure attached to the bottom-side of the of mounting plate, the flexure including a pad layer and a through-hole extending through the pad layer, wherein epoxy on the pad layer bonds widely to the microactuator and extends through the through-hole; and
      a via, the via to connect a copper (Cu) layer of the flexure to a metal layer of the flexure.

2. The disk drive of claim 1 further comprising a plurality of through-holes, each through-hole extending through the pad layer.

3. The disk drive of claim 1 wherein the microactuator is a piezoelectric microactuator.

4. The disk drive of claim 3 wherein the piezoelectric microactuator includes a gold layer to which the epoxy is bonded.

5. The disk drive of claim 1 wherein the epoxy includes silver (Ag).

6. The disk drive of claim 1 wherein the pad layer of the flexure includes an insulator layer and a metal layer.

7. The disk drive of claim 1 wherein the pad layer of the flexure includes a copper (Cu) layer with gold (Au) coating.

8. The disk drive of claim 7 wherein the copper layer of the flexure further comprises a ground trace and a plurality of other traces.

9. The disk drive of claim 1 wherein the metal layer of the flexure is stainless steel.

10. A suspension assembly comprising:
    a mounting plate having a top-side and a bottom-side;
    a microactuator mounting structure formed in the mounting plate;
    a microactuator mounted in the microactuator mounting structure to position a read head, the microactuator having a top-side and a bottom-side;
    a flexure attached to the bottom-side of the of mounting plate, the flexure including a pad layer and a through-hole extending through the pad layer, wherein epoxy on the pad layer bonds widely to the microactuator and extends through the through-hole; and
    a via, the via to connect a copper (Cu) layer of the flexure to a metal layer of the flexure.

11. The suspension assembly of claim 10 further comprising a plurality of through-holes, each through-hole extending through the pad layer.

12. The suspension assembly of claim 10 wherein the microactuator is a piezoelectric microactuator.

13. The suspension assembly of claim 12 wherein the piezoelectric microactuator includes a gold layer to which the epoxy is bonded.

14. The suspension assembly of claim 10 wherein the epoxy includes silver (Ag).

15. The suspension assembly of claim 10 wherein the pad layer of the flexure includes an insulator layer and a metal layer.

16. The suspension assembly of claim 10 wherein the pad layer of the flexure includes a copper (Cu) layer with gold (Au) coating.

17. The suspension assembly of claim 16 wherein the copper layer of the flexure further comprises a ground trace and a plurality of other traces.

18. The suspension assembly of claim 10 wherein the metal layer of the flexure is stainless steel.

* * * * *